(12) United States Patent
Hanumalagutti et al.

(10) Patent No.: US 10,008,908 B2
(45) Date of Patent: Jun. 26, 2018

(54) ELECTRIC MACHINE FOR VEHICLE

(71) Applicant: Ford Global Technologies, LLC, Dearborn, MI (US)

(72) Inventors: Prasad Dev Hanumalagutti, Dearborn, MI (US); Michael W. Degner, Novi, MI (US); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 15/072,729

(22) Filed: Mar. 17, 2016

(65) Prior Publication Data
US 2017/0271957 A1    Sep. 21, 2017

(51) Int. Cl.
*H02K 9/19* (2006.01)
*H02K 5/20* (2006.01)
*H02K 3/24* (2006.01)
*B60K 1/00* (2006.01)
*H02K 1/20* (2006.01)

(52) U.S. Cl.
CPC ............... *H02K 9/19* (2013.01); *B60K 1/00* (2013.01); *H02K 3/24* (2013.01); *H02K 5/20* (2013.01); *B60K 2001/006* (2013.01); *H02K 1/20* (2013.01)

(58) Field of Classification Search
CPC ........... H02K 9/19; H02K 9/197; H02K 1/20; H02K 3/24
See application file for complete search history.

(56) References Cited

U.S. PATENT DOCUMENTS

| | | | |
|---|---|---|---|
| 2,975,309 A | 5/1959 | Seidner | |
| 3,574,325 A | 4/1971 | Agarwal | |
| 3,995,181 A * | 11/1976 | Suit .................. | H02K 3/24 165/104.19 |
| 4,413,201 A | 11/1983 | Nikitin et al. | |
| 4,845,394 A | 7/1989 | Kleinhans | |
| 5,845,389 A | 12/1998 | Roberts et al. | |
| 6,211,587 B1 | 4/2001 | Enomoto et al. | |
| 6,300,693 B1 | 10/2001 | Poag et al. | |
| 6,407,474 B1 | 6/2002 | Mahn et al. | |
| 6,452,294 B1 | 9/2002 | Vandervort et al. | |
| 6,727,611 B2 | 4/2004 | Bostwick | |
| 6,787,950 B2 | 9/2004 | Heim | |
| 6,856,053 B2 | 2/2005 | LeFlem et al. | |
| 6,954,010 B2 | 10/2005 | Rippel et al. | |
| 7,157,818 B2 | 1/2007 | Jones | |
| 7,160,086 B2 | 1/2007 | Maceyka et al. | |
| 7,538,457 B2 | 5/2009 | Holmes et al. | |
| 7,566,999 B2 | 7/2009 | Neal | |
| 7,591,147 B2 | 9/2009 | Masoudipour et al. | |
| 7,692,356 B2 | 4/2010 | Bott et al. | |
| 7,768,166 B2 | 8/2010 | Lafontaine et al. | |
| 7,888,828 B2 | 2/2011 | Takahashi et al. | |
| 7,928,348 B2 | 4/2011 | Neal | |

(Continued)

*Primary Examiner* — Dang Le
(74) *Attorney, Agent, or Firm* — David B. Kelley; Brooks Kushman P.C.

(57) ABSTRACT

A vehicle electric machine includes a rotor, and a stator having a core with an end face and end windings adjacent to the end face. An annular cooling trough has an outer sidewall and a bottom. The trough is connected to the end face such that the bottom engages the core, and the sidewall, bottom and end face cooperate to define an open channel around the end windings configured to receive fluid therein.

16 Claims, 7 Drawing Sheets

(56) References Cited

U.S. PATENT DOCUMENTS

| | | |
|---|---|---|
| 7,952,240 B2 * | 5/2011 | Takenaka ................ H02K 1/20 310/260 |
| 8,080,908 B2 | 12/2011 | Matsubara et al. |
| 8,080,909 B2 | 12/2011 | Perkins |
| 8,093,770 B1 | 1/2012 | Berhan |
| 8,138,640 B2 | 3/2012 | Urano et al. |
| 8,198,762 B2 | 6/2012 | Gagnon |
| 8,405,262 B1 | 3/2013 | Beatty et al. |
| 8,766,497 B2 | 7/2014 | Goto et al. |
| 8,963,384 B2 | 2/2015 | Kirkley, Jr. et al. |
| 8,970,073 B2 | 3/2015 | Miyamoto et al. |
| 9,419,499 B2 | 8/2016 | Matsui et al. |
| 9,438,082 B2 | 9/2016 | Kurono et al. |
| 9,768,658 B2 | 9/2017 | Bulatow |
| 9,881,019 B2 | 1/2018 | Matsuo |
| 9,897,190 B2 | 2/2018 | Yu |
| 9,935,534 B2 | 4/2018 | Vollmer |
| 2002/0153784 A1 | 10/2002 | Kanppenberger |
| 2008/0035399 A1 | 2/2008 | Murata et al. |
| 2008/0042498 A1 | 2/2008 | Beer |
| 2008/0042502 A1 | 2/2008 | VanLuik et al. |
| 2008/0143203 A1 | 6/2008 | Purvines et al. |
| 2010/0045125 A1 | 2/2010 | Takenaka et al. |
| 2011/0215660 A1 | 9/2011 | Goto et al. |
| 2012/0032543 A1 | 2/2012 | Chakraborty et al. |
| 2012/0062056 A1 | 3/2012 | Bradfield |
| 2012/0091838 A1 | 4/2012 | Miyamoto et al. |
| 2012/0242178 A1 | 9/2012 | Miyamoto et al. |
| 2013/0342049 A1 | 12/2013 | Stridsberg |
| 2014/0117796 A1 | 5/2014 | Kassler |
| 2014/0265663 A1 | 9/2014 | Chamberlin et al. |
| 2014/0265670 A1 | 9/2014 | Chamberlin et al. |
| 2014/0354090 A1 | 12/2014 | Chamberlin |
| 2015/0217632 A1 | 8/2015 | Lebeau et al. |
| 2015/0280525 A1 | 10/2015 | Rippel et al. |
| 2015/0280526 A1 | 10/2015 | Chamberlin et al. |
| 2016/0006302 A1 | 1/2016 | Gugel et al. |
| 2016/0308414 A1 | 10/2016 | Takahashi |
| 2017/0012504 A1 | 1/2017 | Sever |
| 2017/0025911 A1 | 1/2017 | Jewell et al. |
| 2017/0288506 A1 | 10/2017 | Asagara et al. |
| 2018/0062456 A1 | 3/2018 | Sung et al. |

* cited by examiner

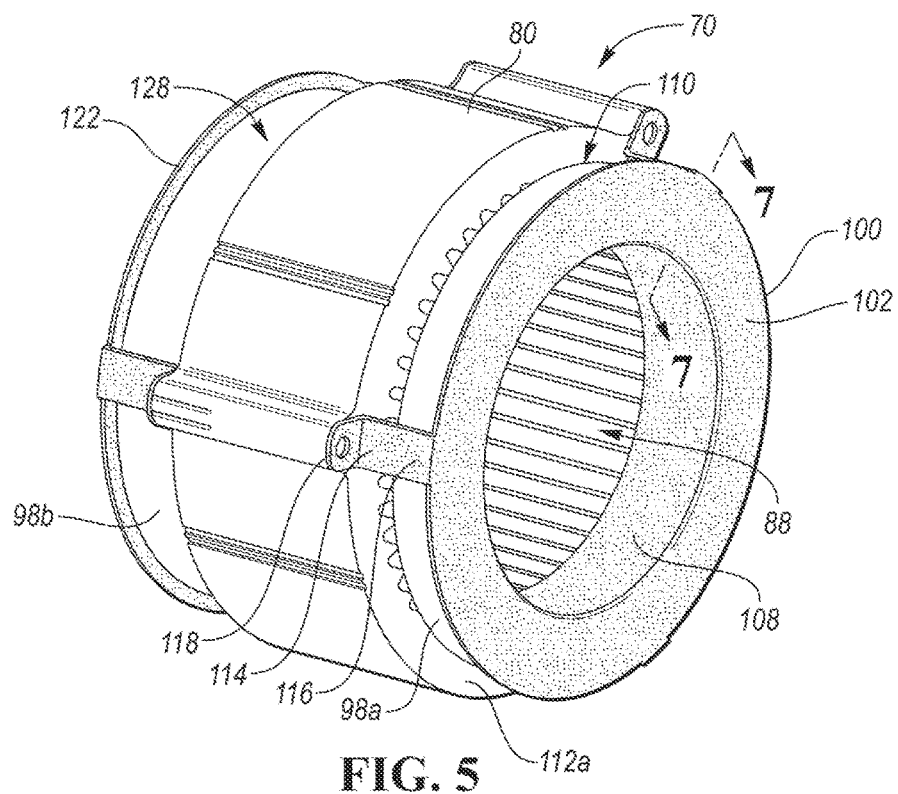
FIG. 5
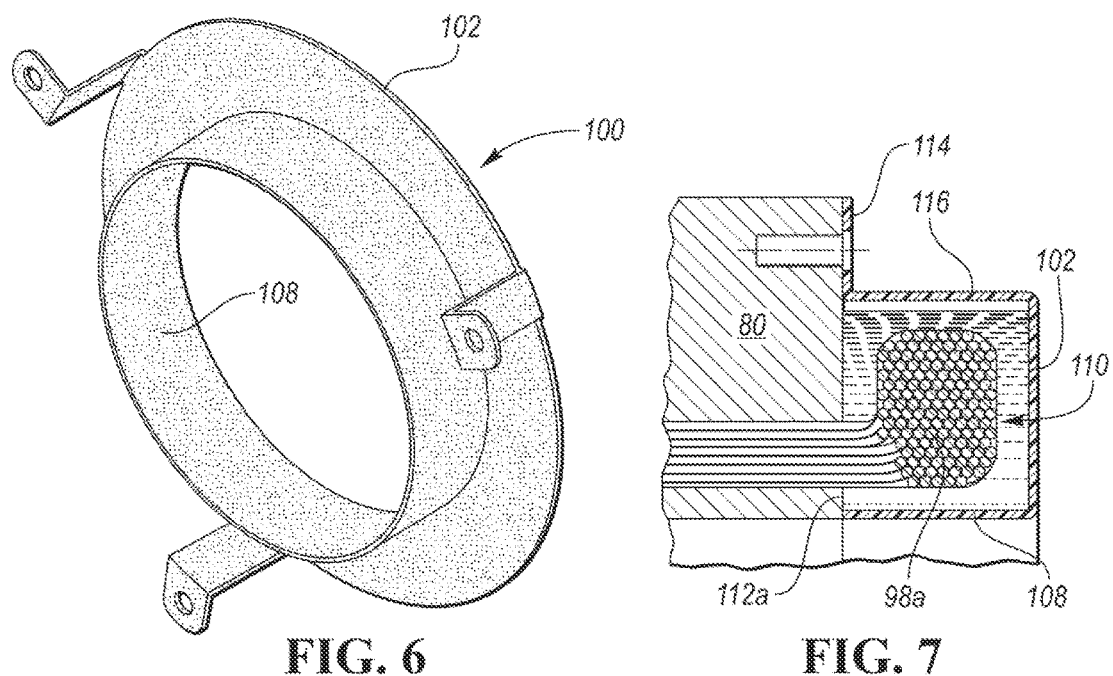
FIG. 6
FIG. 7

ELECTRIC MACHINE FOR VEHICLE

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, a vehicle electric machine includes a rotor, and a stator having a core with an end face and end windings adjacent to the end face. An annular cooling trough has an outer sidewall and a bottom. The trough is connected to the end face such that the bottom engages the core, and the sidewall, bottom and end face cooperate to define an open channel around the end windings configured to receive fluid therein.

According to another embodiment, a vehicle electric machine includes a stator having a core with ends and slots extending therebetween. Windings are disposed in the slots and having end windings. An arch-shaped trough is mounted to one of the ends, and has an outer sidewall and a bottom defining an open cooling channel configured to receive one of the end windings and to extend around less than 270 degrees of the one of the ends.

According to yet another embodiment, a transmission includes a housing defining an orifice and a passageway in fluid communication with a valve body. An electric machine is disposed within the housing. The electric machine has a stator defining slots, and windings disposed in the slots and having end windings. A circular cooling trough defines an open channel that is configured to receive one of the end windings. The orifice is arranged to direct oil into the open channel to cool the end windings.

BRIEF DESCRIPTION OF THE DRAWINGS

FIG. 5 is a perspective view of an electric machine.

FIG. 6 is a perspective view of the cover of the electric machine shown in FIG. 5.

FIG. 7 is a cross-sectional view of the electric machine along cut line 7-7.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
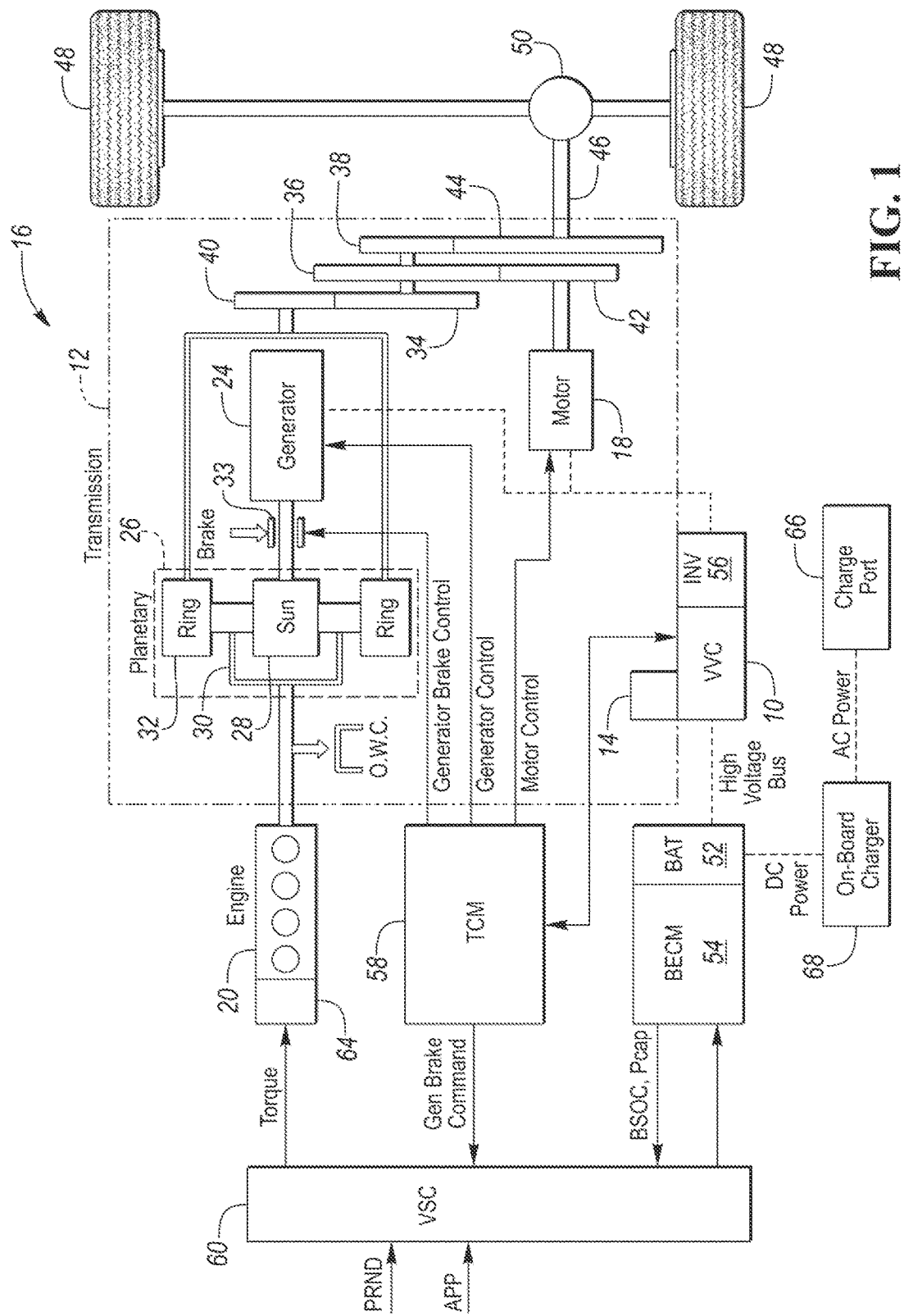
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52.

Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
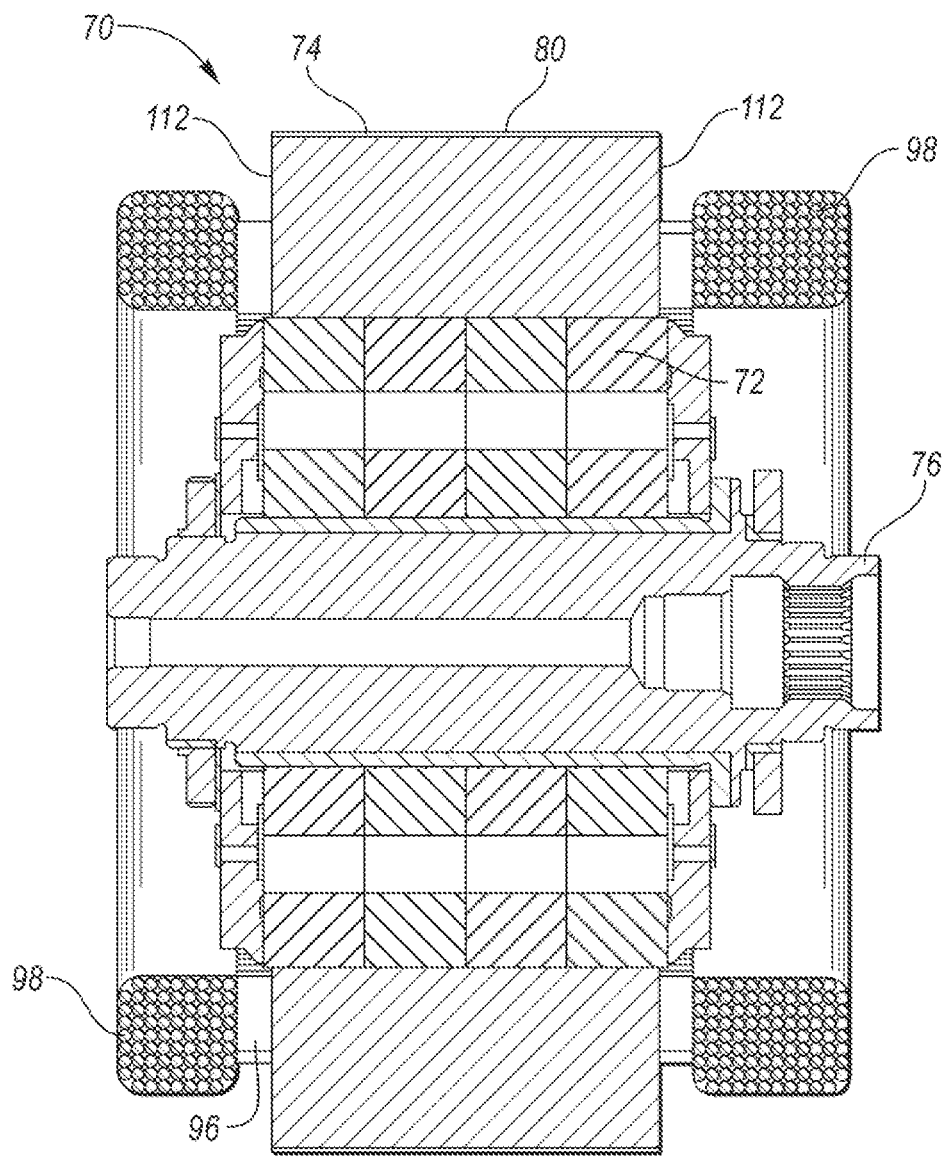
FIG. 2 is side view, in cross section, of a portion of an example electric machine.
Figure 3:
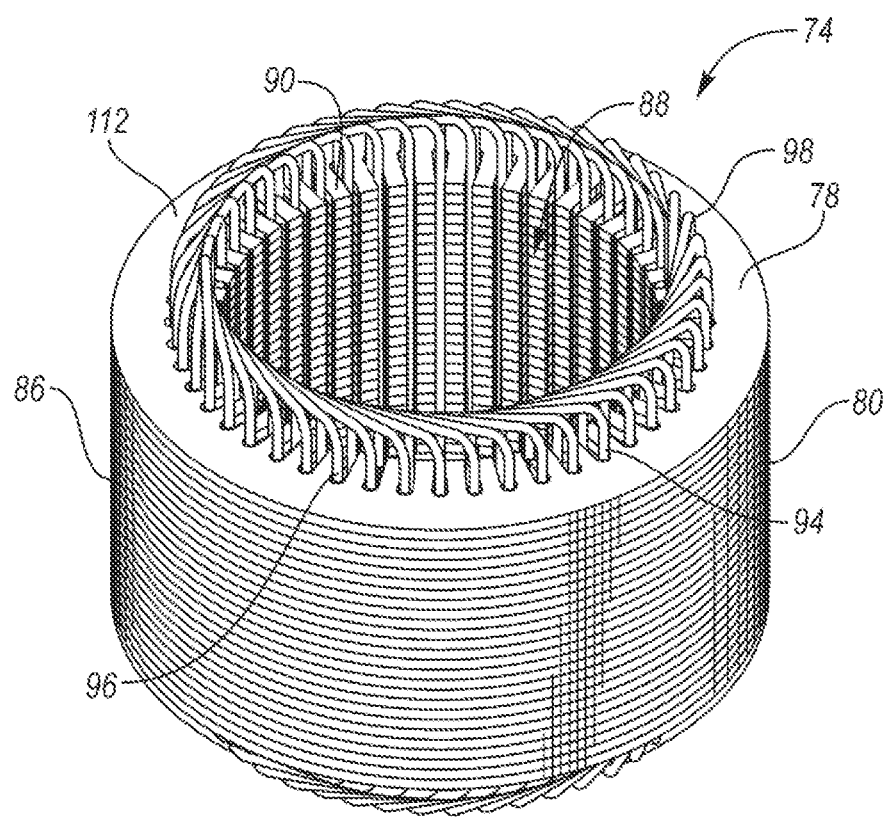
FIG. 3 is a perspective view of a stator of an electric machine.
Figure 4:
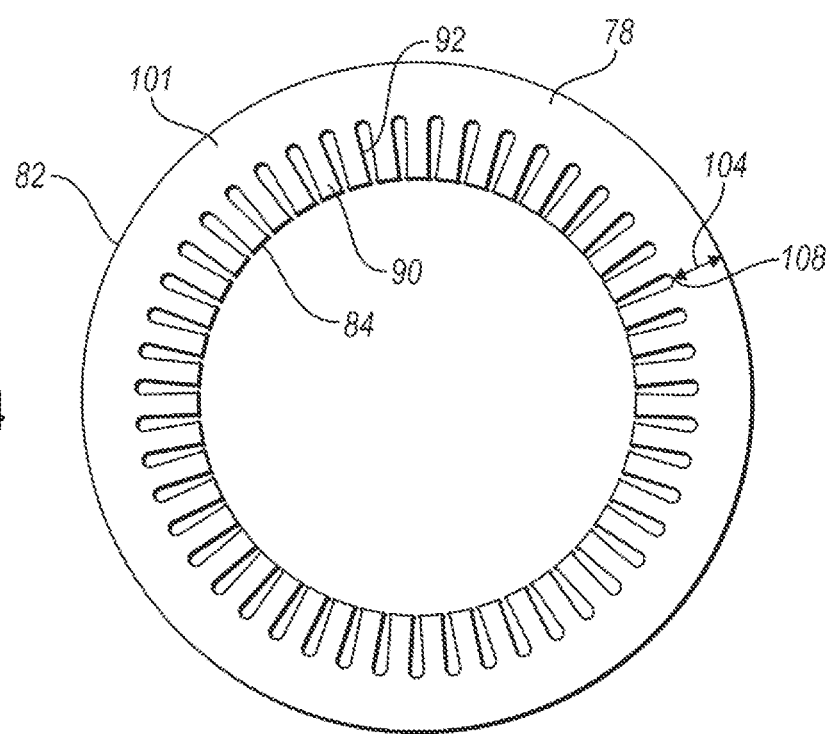
FIG. 4 is a top view of a lamination of the stator shown in FIG. 3.

Referring to FIGS. 2, 3, and 4 an example electric machine 70 includes a stator 74 having a plurality of laminations 78. Each of the laminations 78 includes a front side 101 and a back side. When stacked, the front and back sides are disposed against adjacent front and back sides to form a stator core 80. Each of the laminations 78 may be doughnut shaped and may define a hollow center. Each lamination 78 also includes an outer diameter (or outer wall) 82 and an inner diameter (or inner wall) 84. The outer diameters 82 cooperate to define an outer surface 86 of the stator core 80, and the inner diameters 84 cooperate to define a cavity 88.

Each lamination 78 includes a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending through the stator core 80 between the opposing end faces 112. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core, the windings bend to extend circumferentially around the end faces 112 of the stator core 80 forming the end windings 98. The end faces 112 define the opposing ends of the core 80 and are formed by the first and last laminations of the stator core 80. While shown as having distributed windings, the windings could also be of the concentrated type.

A rotor 72 is disposed within the cavity 88. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts.

During operation, the electric machine 70 generates heat within the stator core 80 and the windings 96. To prevent overheating of the electric machine, a fluid circuit may be provide to remove heat generated during operation.

Figure 8:
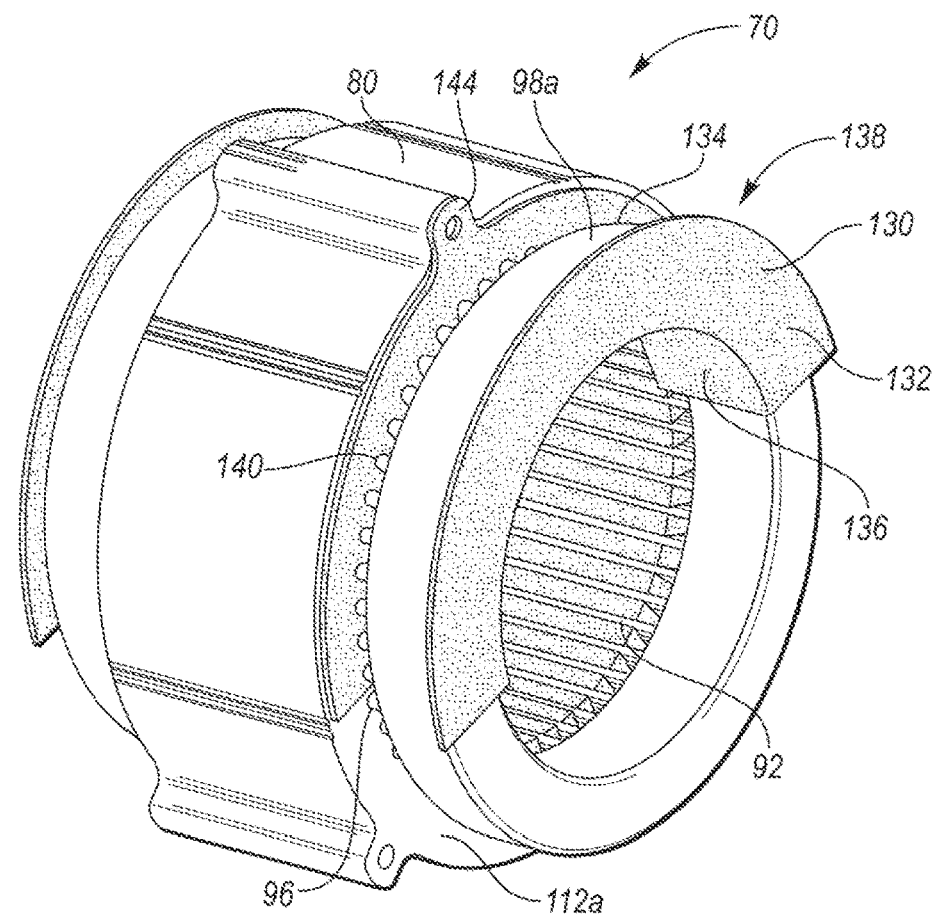
FIG. 8 is a perspective view of the electric machine having a cooling device according to another embodiment.

Referring to FIGS. 5, 6 and 7, the electric machine 70 may be cooled by circulating a cooling medium over the end windings 98. The cooling medium may be oil (such as transmission fluid), or any other suitable heat transfer liquid. A cooling device may be used to convey the cooling medium over the end windings 98. A circular cooling trough 100 is mounted to the stator core 80 at the end face 112*a*. Used herein, the term "circular" does not require a complete circle. Rather the term "circular" describes both fully circular and partially circular geometries. (For example, the trough 130 shown in FIG. 8 is considered to be circular even though it only a half circle.) In the illustrated embodiment, an annular cooling trough 100 is shown that extends 360 degrees around the end face 112. The annular cooling trough 100 includes an outer wall 102 and a bottom 108 that extends substantially perpendicularly from the outer wall 102. The trough 100 is circular in shape to conform with the circular shape of the stator core 80 and the end windings 98. The trough 100 may be a complete circle (an annuals) as shown, or may be a semi-circle (arch shaped) and only extend around a upper portion of the stator core 80. The outer wall 102 may be sized similar to that of the laminations 78, but may be slightly smaller or larger depending upon the embodiment. The bottom 108 may be ring-shaped and may have a radius that is substantially equal to the radius of the inner diameter 84 of the laminations 78. The radius of the bottom 108 may be slightly smaller than the inner diameter 84 in some embodiments to allow a portion of the bottom 108 to be received within the cavity 88.

The trough 100 includes mounting ears 114 for attaching the trough 100 to the end face 112*a*. Each of the mounting ears 114 may include an arm 116 extending from the outer wall 102 and a tab 118 that is bent substantially perpendicular to the arm and includes a hole for receiving a fastener 120 to attach the tab 118 to the stator core 80. The bottom 108 may be sized to abut the end face 112*a*, or in some embodiments, may extend at least partially into the rotor cavity 88 and engage with the inner surface 106. The outer wall 102, the bottom 108, and the end face 112 cooperate to define a an open circular channel 110 that conforms with the circular shape of the end windings 98. The end windings 98*a* are disposed within the channel 110. The depth of the channel 110 may be more or less than the distance between the inner diameter 84 and the outer diameter 82 of the laminations 78. During operation, fluid is supplied to the channel 110 through the open top to immerse the end windings in the fluid to remove heat from the electric machine 70.

The electric machine 70 may also include a second trough 122 disposed on the opposite end face 112*b*. The second trough 122 may be similar to the first trough 100 and also includes an outer wall 124 and a bottom 126 that cooperate with the stator core 80 to define an open channel 128 that partially surrounds the end windings 98*b* and that is configured to convey fluid across the end windings 98*b*.

Figure 9:
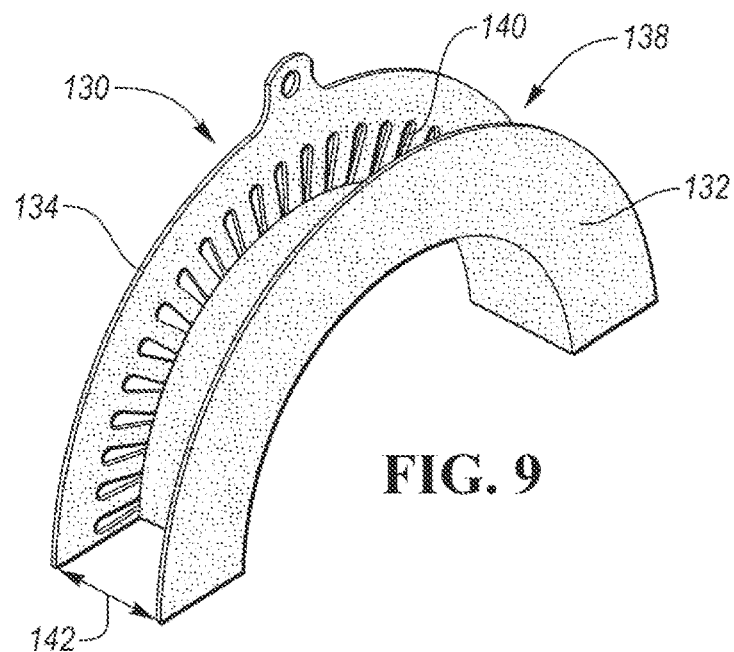
FIG. 9 is a perspective view of the cover shown in FIG. 8.

FIGS. 8 and 9 illustrate an arch-shaped cooling trough 130 for the electric machine 70. The arch-shaped trough 130 is circular to conform with the shape of the stator core 80. The arch-shaped trough 130 may be a semicircle as shown, or may be modified to be a complete circle similar to the embodiment shown in FIG. 5. Of course, this disclosure is not limited to troughs that extend around 180 degrees or 360 degrees of the end face 112. Instead, this disclosure contemplates circular troughs extending anywhere between 90 and 360 degrees around the end face 112.

The arch-shaped trough 130 may include an outer wall 132, an inner wall 134, and a bottom 136 extending therebetween. The inner and outer walls 134, 132 may be substantially parallel with each other, and the bottom 136 may be substantially perpendicular to the inner and outer walls.

The walls 132, 134 and the bottom 136 cooperate to define an open channel 138 that is circular in shape. The trough 130 includes an open top allowing fluid to be projected into the channel 138 through the gap 142 defined between the inner and outer walls 132, 134. The inner wall 134 is disposed against the end face 112*a* and defines openings 140 that are similar in size and shape to the stator slots 92. The openings 140 align with the stator slots 94 allowing the windings 96 to extend through the openings 140 and into the channel 138. The end windings 98*a* are disposed within the channel 138 allowing cooling of the end windings when fluid circulates through the channel 138. The inner wall 134 may include one or more tabs 144 for attaching the trough 130 to the stator core 80.

The trough 130 may be formed of a single-piece construction or may be formed of a multi-piece construction. For example, the inner wall 134 may be a separate piece that is first assembled to the stator core 80 and is then attached to the bottom 136. For example, the inner wall 134 and the bottom 136 may snap together. In another example, the inner wall 134 and the bottom 136 are a single piece that are first attached to the stator core 80 and then are attached to the outer wall 132. Having multi-piece construction may make it easier to thread the windings 96 through the openings 140.

Figure 10:
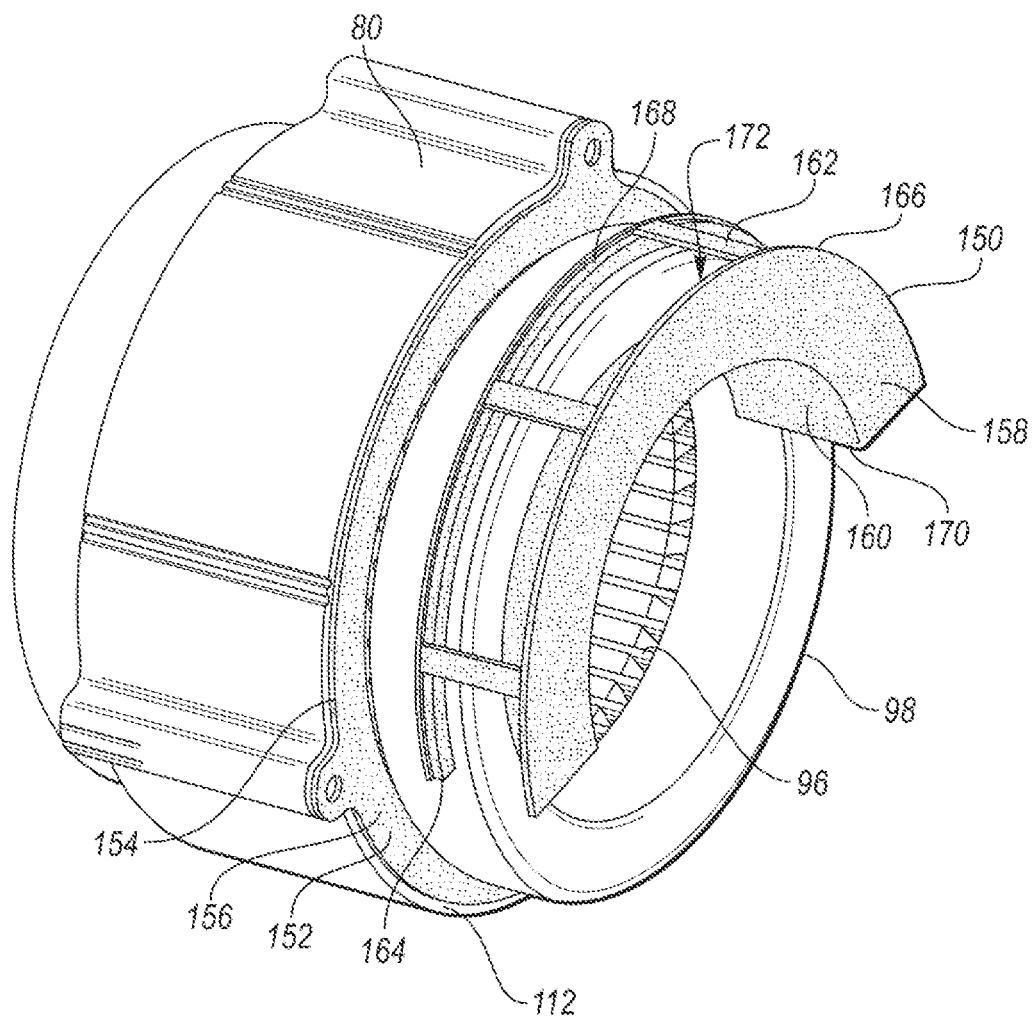
FIG. 10 is a perspective view, partially exploded, of the electric machine having a cooling device according to yet another embodiment.

FIG. 10 illustrates an example trough 150 having two-piece construction. The trough 150 may be a semi-circle or a complete circle for example. The trough 150 includes an inner wall 152 that is mounted to the end face 112 of the stator core. The inner wall 152 may include one or more tabs that may be fastened to the stator core. The inner wall 152 is circular and has an inner diameter sized to be outboard of the windings 96. The inner wall 152 includes a first side 154 that is disposed against the end face 112 and a second side 156 that faces away from the end face.

The trough 150 also includes a second piece that consists of an outer wall 158, a bottom 160, ribs 162, and a band 164. The outer wall 158, the bottom 160, and the band 164 are circular. The band 164 is spaced apart from the outer wall 158, and the ribs 162 extend therebetween to connect the band 164 and the outer wall 158. The ribs 162 may connect to the outer diameter 166 of the outer wall and may connect to the outer diameter 168 of the band. The bottom 160 extends from the inner diameter 170 of the outer wall towards the band 164. In some embodiments, the bottom 160 may extend past the band 164.

The inner wall 152 and the band 164 are configured to connect with each other to fully assemble the trough 150. For example, a snap feature, or similar feature may be used to connect the inner wall and the band. Alternatively, adhesive or other bonding means may be used to connect the inner wall to the band. Once connected, the inner wall 152, the outer wall 158, and the bottom 160 cooperate to define an open circular channel 172 that is configured to convey fluid across the end windings 98. A second trough, that may be the same or similar to trough 150, may be attached to the other end face of the stator core.

Figure 11:
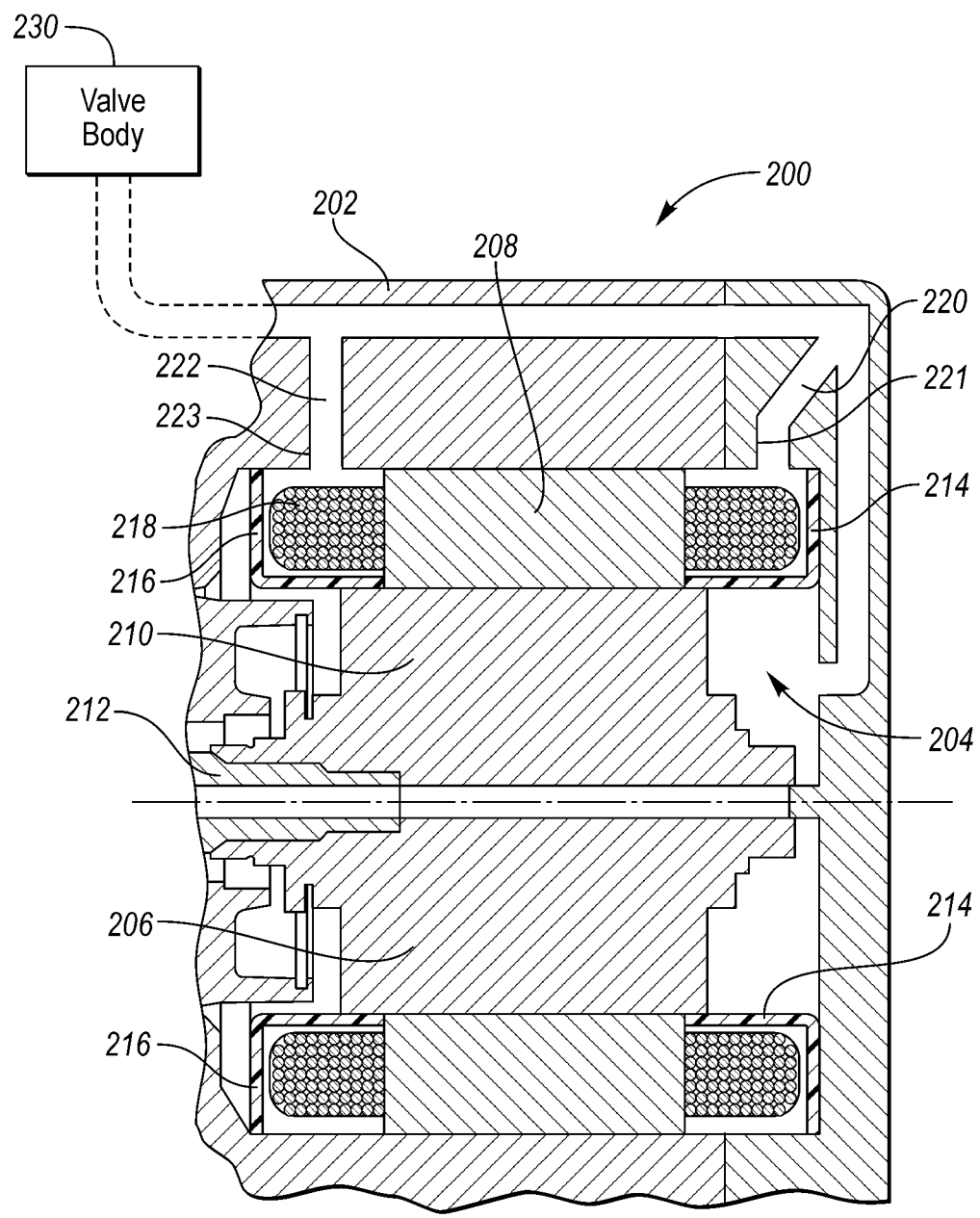
FIG. 11 is a side view, in cross section, of a portion of a transmission with a valve body of the transmission diagrammatically shown.

Referring to FIG. 11, a hybrid transmission 200 includes a housing 202 defining a cavity 204. An electric machine 206 (which may be the same or similar to electric machine 70) is supported within the cavity 204. The electric machine 206 includes a stator 208 that is mounted to the housing 202 such that the stator is unable to rotate relative to the housing 202. The rotor 210 is disposed within the stator and is fixed (e.g., splined) to a shaft 212. The shaft 212 may connect to the gear box.

The electric machine includes a pair of troughs 214, 216 (which may be the same or similar to troughs 100, 130, or 150) are connected to the stator 258 to form cooling channels around the end windings 218. The first trough 214 is positioned in the transmission such that an orifice 221 of the passageway 220 conveys oil into the channel of the trough 214 through the open top. The second trough 216 is positioned in the transmission such that an orifice 223 of the passageway 222 conveys oil into the channel of the trough 216 through the open top. The oil circulates through the channels to cool the end windings 218. The oil exits the channels through the open bottom and drains to the transmission sump (not shown) of the transmission via passageways. The passageways 220 and 222 are in fluid communication with a valve body 230 of the transmission 200.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle electric machine comprising:
   a rotor;
   a stator including a core having an end face, and end windings adjacent to the end face; and
   an annular cooling trough including an outer sidewall and a bottom, and connected to the end face such that the bottom engages the core, and the sidewall, bottom and end face cooperate to define an open channel around the end windings configured to receive fluid therein, wherein the cooling trough further includes a mounting ear having a first portion attached to the outer sidewall and a second portion attached to the end face.

2. The vehicle electric machine of claim 1 wherein the cooling trough further includes an inner sidewall extending from the bottom and disposed against the end face.

3. The vehicle electric machine of claim 2 wherein the stator further includes windings extending through stator slots, and wherein the inner sidewall defines an opening aligned with the stator slots and configured to receive the windings therethrough.

4. The vehicle electric machine of claim 1 wherein the stator further includes a second end face, further comprising a second cooling trough including an outer sidewall and a bottom, and connected to the second end face such that the bottom engages the core, wherein the sidewall, bottom and second end face cooperate to define an open annular channel around a second set of end windings and configured to receive fluid therein.

5. A vehicle electric machine comprising:
   a stator including a core having ends and slots extending therebetween;
   windings disposed in the slots and including end windings; and
   an arch-shaped trough mounted to one of the ends, and including an outer sidewall and a bottom defining an open cooling channel configured to receive one of the end windings and to extend around less than 270 degrees of the one of the ends.

6. The vehicle electric machine of claim 5 further comprising a second arch-shaped trough mounted to the other of the ends and including an outer sidewall and a bottom defining an open cooling channel configured to receive an other of the end windings and to extend around less than 270 degrees of the other of the ends.

7. The vehicle electric machine of claim 5 wherein the trough further includes an inner sidewall connected to the bottom and defining openings aligned with the slots, and wherein each of the openings is configured to receive a portion of the windings.

8. The vehicle electric machine of claim 5 wherein the outer sidewall defines a pair of concentric curved walls and a pair of linear walls each extending between the curved walls.

9. The vehicle electric machine of claim 5 wherein the bottom includes an end wall that is disposed against the one of the ends.

10. The vehicle electric machine of claim 5 further comprising a rotor disposed with a cavity of the stator.

11. A transmission comprising:
    a housing defining an orifice and a passageway in fluid communication with a valve body; and an electric machine disposed within the housing and including
a stator defining slots,
windings disposed in the slots and including end windings, and
a circular cooling trough defining an open channel configured to receive one of the end windings, wherein the orifice is arranged to direct oil into the open channel to cool the end windings.

12. The transmission of claim 11 wherein the cooling trough further includes an outer sidewall, an inner sidewall and a bottom extending therebetween, and wherein the sidewalls and bottom cooperate to define the open channel.

13. The transmission of claim 12 wherein the inner sidewall defines an opening aligned with the slots, and wherein each of the openings receives a portion of the windings therein.

14. The transmission of claim 11 wherein the electric machine further comprises a second cooling trough defining a second open channel configured to receive the other of the end windings, and wherein the housing further defines a second orifice arranged to direct oil into the second open channel to cool the end windings.

15. The transmission of claim 11 wherein the housing further includes an end cover, and wherein the orifice is defined by the end cover.

16. The transmission of claim 11 wherein the electric machine further comprises a rotor disposed within a cavity of the stator.

* * * * *